Dec. 19, 1939.    R. D. CLEMSON    2,183,544
SHEARING DEVICE
Filed Dec. 4, 1935    4 Sheets-Sheet 1

INVENTOR
Richard D. Clemson
BY
ATTORNEY

Dec. 19, 1939.  R. D. CLEMSON  2,183,544
SHEARING DEVICE
Filed Dec. 4, 1935  4 Sheets-Sheet 2

INVENTOR
Richard D. Clemson
BY
ATTORNEY

Dec. 19, 1939.   R. D. CLEMSON   2,183,544
SHEARING DEVICE
Filed Dec. 4, 1935   4 Sheets-Sheet 3

INVENTOR
Richard D. Clemson
BY
ATTORNEY

Dec. 19, 1939. R. D. CLEMSON 2,183,544
SHEARING DEVICE
Filed Dec. 4, 1935 4 Sheets-Sheet 4

INVENTOR
Richard D. Clemson
BY
ATTORNEY

Patented Dec. 19, 1939

2,183,544

UNITED STATES PATENT OFFICE 2,183,544

SHEARING DEVICE

Richard D. Clemson, Middletown, N. Y., assignor to Clemson Bros., Inc., Middletown, N. Y., a corporation of New York Application December 4, 1935, Serial No. 52,757

11 Claims. (Cl. 56—294)

This invention relates to cutters and mowers and more particularly to mowers of the rotating reel and bed knife type.

In the past lawn mowers have been made with a rotating reel having spiral fly knives with their edges in the surface of a geometrical cylinder and a bed knife secured to the frame in which the reel rotates and with its edge also on the surface of the same cylinder so that as the fly knives rotate they form with the bed knife a shear for cutting the grass, etc. Mowers of this type have become highly standardized in design and construction and almost no change has been made for a generation. Notwithstanding this, however, the present design and construction is in many respects unsatisfactory. The knives being rigid depend entirely upon perfect adjustment for satisfactory shear action, but for the same reason it is nearly impossible to maintain perfect adjustment. Bits of wire, nails, stones and sand which invariably collect in any lawn are caught between these unyielding blades and although they may stall the machine, requiring the operator to stop and clear them out of the way, the impact of the rotating blade against the obstacle will often produce a dent in the metal of which the blade is made. Thus, no matter how carefully the blades are ground and adjusted before work is begun the machine will soon be in an unsatisfactory condition. Furthermore, it is extremely difficult to adjust such a machine tight enough to give any satisfactory cut without having it so tight that the operator is tired out by the drag of unnecessary friction between the blades.

Accordingly, it is an object of my present invention to provide a cutter of the lawn mower type which will be self-adjusting to operate with the optimum pressure required for satisfactory cutting and to vary such pressure according to momentary requirements for cutting which will be highly resistant to damage by obstructions ordinarily encountered in the cutting of lawns, and which in general will combine a free running action with efficient cutting. Another object is to provide a lawn mower of simpler and lighter construction than has been common heretofore, whereby it is more economical in cost and easier to use and maintain.

I have found that my principal object can be attained by resiliently pressing the blades together, e. g., by spring pressure, drive reaction, gravity, and/or centrifugal force of the rotating blades, provided that the construction is satisfactorily designed in other respects as hereinafter more particularly described.

I am well aware that I am not the first to suggest the use of resiliently pressed blades in a lawn mower. On the contrary, numerous designs have been suggested to use resiliently pressed blades in order to avoid the necessity for frequent adjustment, but these suggestions have failed of adoption in the art because of defects which heretofore have not been adequately recognized nor satisfactorily cured. In the past, for example, there has been a dilemma between pressing the blades strongly enough to hold under the heaviest cut and yet allowing a free action for ordinary light cutting. If the resiliently pressed blade was mounted to allow obstructions to pass, it would ordinarily also permit the passage of a heavy cut of grass or other material which should be handled by the shear, and particularly if the blades were designed to exert a sufficient pressure for necessary cutting without excessive pressure the ordinary wear on the blade would result in a sufficient yielding of the spring to substantially reduce the pressure so that in fact the automatic adjustment would not be complete, and in order to obtain best results a manual adjustment had to be made in spite of the resilient mounting.

After making and testing many machines with the resilient self-adjusting blades I have determined that there are a number of factors which must be properly related in order to obtain a satisfactory practical result.

In the first place, the spring or other means for exerting the resilient pressure on the blade must have sufficiently high limit of elasticity so that, up to the point at which it stalls the machine, it will pass any obstruction without permanent deformation. This requires that it have a high limit of elasticity and at the same time, its load/deflection characteristic, i. e., the rate at which the force exerted by the spring increases as the spring is deflected from its relaxed condition, should be sufficiently low that the movement due to normal wear on the edge of the blade will not produce an objectionable variation in the pressure between the blades; and sufficiently high so that within a reasonable deflection the pressure increase without the use of additional stops or guards will stall the machine.

If the reel is rotatable in fixed pivots and has rigidly mounted fly knives, and the resiliency is obtained by a spring mounting of the bed knife, and the edge of the bed knife is movable about an axis tangential to the cylindrical path of the reel or radially thereof, then the problem is fairly simple and involves only the consideration of spring characteristics as discussed above. If the bed knife or the fly knife is movable, otherwise than radially or about an axis on the tangent to the reel, there will be a reaction force due to the drag of the reel upon the bed knife or the engagement of material between the knives, and this force will increase with the resistance of the material to cut between the knives. If the permitted movement of the bed knife has a radial component toward the center of the reel as well as a circumferential component in the direction of motion of the reel, or if the edges of the fly knives have a permitted movement in the reel with an outward radial component as well as a circumferential component counter to the rotation of the reel, then this reaction will support the springs; whereas if the radial component is contrary, the reaction will be opposed to the spring action and will, therefore, require a heavier spring to produce a satisfactory cut and will limit the amount of material which it is possible to cut with the mower at all; if there is no circumferential component, there will be no such reaction adjustment.

If the flexible mounting is between the fly knives and the reel there will then be a centrifugal force which may be either opposed to or adapted to supplement the spring action. And finally, if the flexible mounting is of the reel in the frame then the reaction to the driving torque applied to the reel may serve either to reinforce or to oppose the resilient force which tends normally to hold the blades together.

In the operation of a mower of this type the edge speed of the fly knives is much greater than the speed of the machine as a whole so that the material which is being cut is brushed back over the bed knife between action of the fly knives and consequently tends to lie at an angle between the knives which cooperate in the shear. If the material is soft enough, and the blades are sharp enough, and pressed together tightly enough, the material will be cut, otherwise, the knives may be separated and merely slide over the material. By the use of my invention the cutting of any material, for which the shear is adapted, is assured by the perfect self-sharpening action and the perfect shear contact and thus I avoid the necessity for heavy pressure between the blades. In the preferred embodiment of my invention a fourth consideration is introduced, namely, the reaction cut. If the material is soft enough so that the blades cut into it, but so thick that it would tend to push the blades apart before they could cut through it, then in this preferred construction embodying my invention the reaction force on one of the knives is utilized to increase the pressure between them, and thus if the material is soft enough to be cut the machine will cut it. On the other hand, if the material is hard so that the blade does not cut into it or so tough that even with the increased pressure it cannot be cut then the blades will separate and allow it to pass through, or the machine will be stalled by the increasing resistance resulting from yielding of the resilient mounting.

In the accompanying drawings I have illustrated a preferred embodiment of my invention and various modifications thereof. These have been chosen with a view to illustrating the principle of my invention and the best manner of applying it to practical use and indicating how such application may be varied to meet the requirements of different particular conditions. It is to be understood that the invention is in no way limited to the specific embodiments shown in the accompanying drawings or described below, but on the contrary that these drawings and the description are particularly intended to enable those skilled in the art to understand and to apply my invention to numerous forms and embodiments best adapted to particular conditions.

The embodiment of my invention which is illustrated in Figs. 1 to 4 inclusive combines several resilient pressure features such as have been generally discussed above. In this case the lawn mower, with the exception of the bed knife and its mounting, is substantially similar to any standard lawn mower as heretofore manufactured for the general market. The wheels 15 are mounted on pivots which are bolted at 17 to the side frames 16. The reel 18 carrying the fly knives 19 is mounted on bearings in the side frames 16 and carries at its ends pinions (not shown) which are connected thereto through a ratchet (not shown). The pinions in turn are driven from an internal gear 20 integral with the wheels 15.

The handle 21 is pivotally mounted on the pin 22 integral with the side frame, and the ground roller 23 is connected to extensions 24 on the side frames through adjustable brackets 25, which by vertical adjustment are adapted to alter the height of the cut which is made by the mower. A cross bar 26 serves to form a rigid connection between the side frames, and also serves as a guard to hold away from the fly knives any object taller than the grass.

Figure 1:
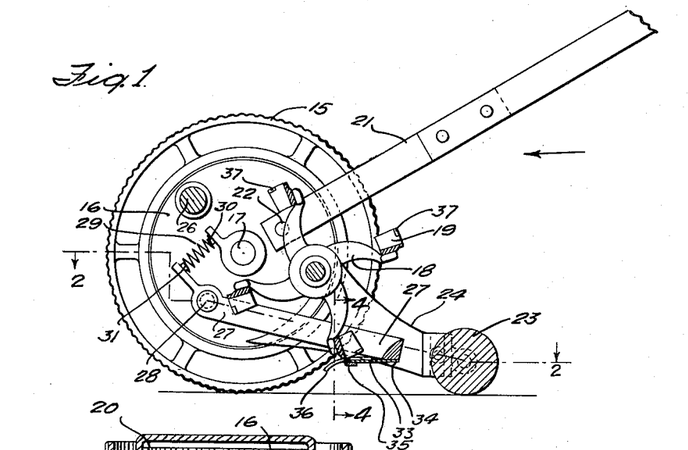
Figs. 1 and 2 are views respectively in vertical and horizontal sections of the lawn mower of preferred form embodying my invention. The section of Fig. 2 is taken on line 2—2 of Fig. 1.

As thus far described the mower is of accepted and standard construction. However, instead of the usual bed knife and mounting I have provided a frame 27 pivoted on the side frames at 28 and urged toward the reel 18 by a light compression spring 29 which is engaged between an anchoring stud 30 on the side frame and a stud 31 on an extension of the bed knife frame 27. This spring 29 is preferably one with a relatively high load/deflection ratio; but almost in its relaxed position when the parts are as shown in Fig. 1, so that it exerts only a very light pressure between the bed knife and the fly knives. The pressure in this position should be just sufficient to assure a clean shear cut when a single or a few blades of grass are engaged between the blades of the mower. The spring 29 is adapted to be compressed sufficiently to allow the frame 27 almost to touch the ground, whereby to permit the passage between the blades of the mower of obstructions which cannot be cut. The load/deflection ratio of the spring is such that in this latter position, i. e., with the frame 27 almost touching the ground, the limit of traction of the wheels 15 on the ground will have been reached and the normal momentum of the machine overcome.

Figures 2, 3:
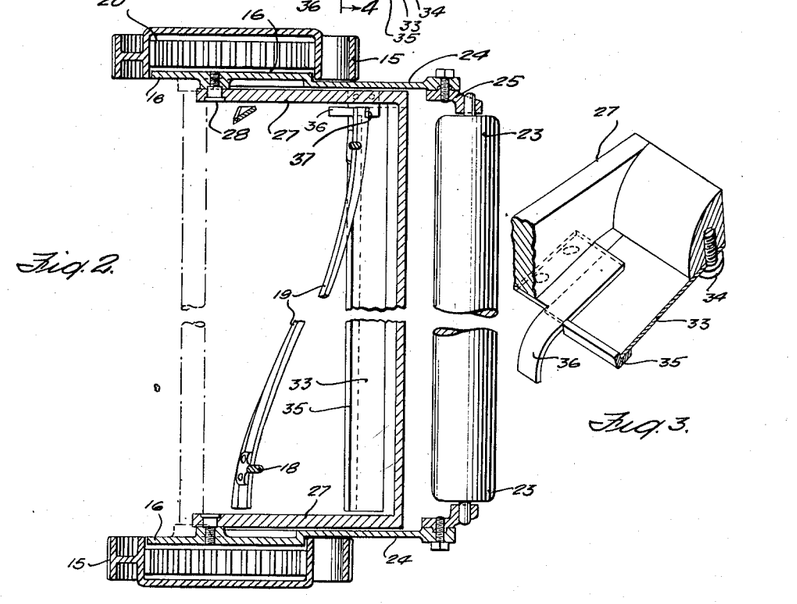
Fig. 3 is a fragmentary view on an enlarged scale showing the ramp for guiding the fly knives onto the resiliently pressed bed knife.

As clearly shown in Fig. 3 the bed knife consists of a spring steel strip 33 held to the frame 27 by bolts 34 and having on its cutting edge a strip of high speed steel 35.

Figure 4:
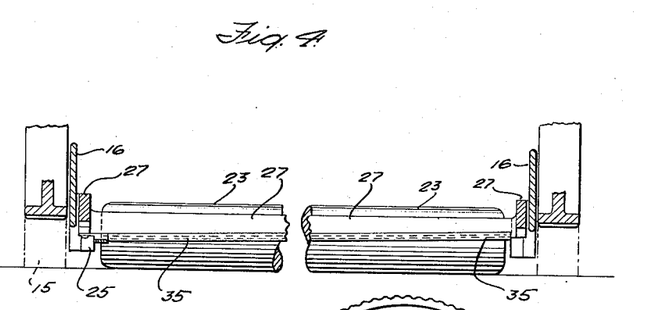
Fig. 4 is a longitudinal section taken on line 4—4 of Fig. 1.

The strip 33 is of about the weight and flexibility of a high grade saw steel, such as is used for example in carpenter's hand saws, and both this and the strip 35 are preferably of rust resisting alloys. The corner of the blade shown in Fig. 3 is held in a sprung position by the rigid guiding cam 36 which is secured to the frame 27. The remainder of the blade, being free, tends to assume a position canted toward its relaxed position as shown in Fig. 4.

When the mower as shown in Figs. 1 to 4 and as described above is put into use the reel 18 is at first driven freely with only the minimum pressure of the spring 29 against the fly knives which is necessary to assure a cut of the lightest materials which may be engaged between the blades 19 and 35 of the mower.

As the reel 18 rotates, the fly knives 19 successively engage the bed knife; and, as each approaches it, the hardened corner 37 slides over the ramp member 36 and cams the entire frame 27 down against the pressure of the spring 29. This movement is very slight, but sufficient to assure the desired minimum pressure at the first point of contact of the edge 35 with the fly knife 19.

As the spiral knife 19 progresses laterally across the edge 35 the spring blade 33 is progressively flexed down from its initial canted position, and the frame 27 is allowed to return slightly toward the reel. Thus, when the next corner 37 engages the ramp 36 it will again have to cam the frame 27 down against the pressure of the spring 29, and notwithstanding this slight release of the first blade 19 from the pressure of the spring 29, the pressure of the spring blade 33 at the farther end thereof will still be exerted against the first blade. This secondary spring action of the blade 33 itself, being relatively free from momentum, permits the bed knife edge to follow more accurately any irregularities in the fly knives than would be possible with the spring 29 alone. Thus, there is a continual pressure exerted between the blades at all times and regardless of irregularities in the blade and regardless of whether there is one or two fly knives 19 in contact with the bed knife.

Figures 5, 11:
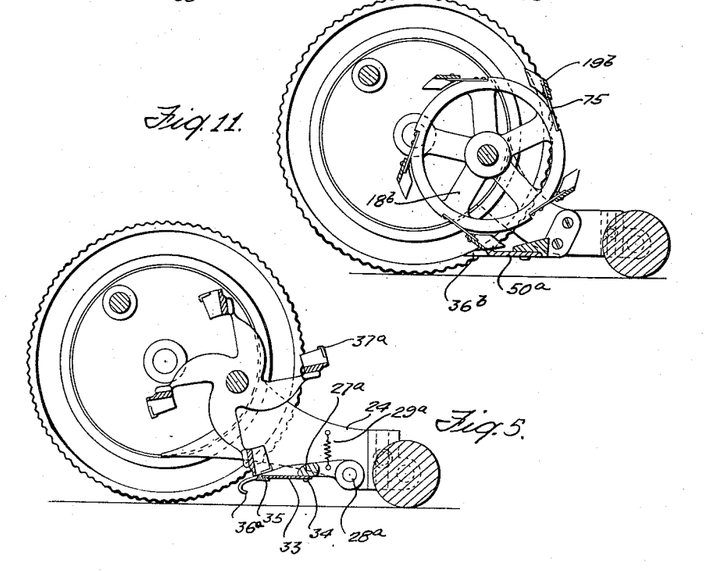
Figs. 5, 6 and 7 are sectional views similar to the section of Fig. 1, but showing other embodiments of my invention.
Fig. 11 is a view similar to Figs. 1 and 5 of another embodiment of my invention in which centrifugal force is utilized for the resilient pressure between the fly knives and bed knife.

The hardened corners 37 are important with this construction because of the greater wear which they receive due to their camming action on the ramp 36. If these corners are not made more wear-resistant than the remainder of the fly knives 19 they may be worn away until a step or slope may be formed in the edge of the fly knife which would tend to catch on the edge 35 and to impair the efficient action of the blade. Obviously, the corners of the blade may be made more wear-resistant by increasing their wearing area, e. g., as shown in Figs. 3 and 5 or by other suitable means instead of or in addition to providing the special wear-resistant material on the corner, as shown in Figs. 1 and 2.

So long as the mower is used only in relatively light cutting its operation continues as described above. As soon as a heavier cut is encountered, however, such as might be expected to crowd between the blades of the mower and to force them apart against the spring pressure, a reaction is produced substantially tangential to the cylindrical path of the fly knives; and, as will be apparent from Fig. 1 of the drawings, this reaction will exert a turning moment on the frame 27 about the pivot 28 which will tend to bring the bed knife more tightly against the reel. Thus, instead of yielding to the heavy cut, the result will be a greater pressure as required by the heavier cut.

The degree to which the pressure is increased by the reaction will depend primarily upon the angle between the line connecting the edge 35 and the pivot 28 on the one hand, and the tangent to the cylinder of the reel 18 at the edge 35 on the other hand. The more nearly perpendicular are these two lines the greater will be the reaction, and the more nearly in line the less will be the reaction. Thus, it is possible in designing the mower, either by choice of the pivot position 28 or of the cutting position 35 to determine accurately the extent of the reaction to conform to the requirements which the machine is to meet in actual use.

If the material encountered should include a nail, or wire, or small pebble or other obstruction which cannot be cut by the blades it will at first produce a reaction exactly the same as with a heavy cut of grass, but when the obstruction fails to yield to the shearing action of the blade and the momentum and driving force on the reel tends to carry the fly knife over the bed knife the result will be to depress the edge 35 either by flexing the blade 33 or by compressing the spring 29, or both, and the obstruction will pass on through and will be cleared from the machine without the necessity for stopping and reversing the action to free the blade, and, what is more important, without substantial injury to the blades themselves.

If the obstruction encountered is a stone or other object too large to be passed through between the blades, the initial action will be the same; first, a reaction tending to tighten the pressure between the blades; secondly, a yielding as the blades pass over one another, but as the bed knife yields more and more the spring pressure increases rapidly until the machine is stalled, i. e., the torque required to continue rotation of the reel exceeds that which can be obtained from the wheels with the given gear ratio. When stalling occurs, the wheels will merely slide over the ground without turning. This structure by which the maximum torque transmitted from the power source (whether manual or mechanical power) is limited is very important; I have referred to this hereinafter as a "limited torque" driving means. The springs 29 and 33 will have absorbed the shock of striking the stone or other object, and consequently the machine will be stalled without substantial injury to the blades.

In Fig. 5, I have shown another embodiment of my invention. In this case, the general construction is similar to that shown in Fig. 1, but instead of the frame 27 bearing the bed knife from a pivot 28 in front of the reel the frame 27a is pivoted to the extension 24 on the side frame as shown at 28a and is urged into engagement by the tension bring 29a which serves the same function as the spring 29 already described in connection with Fig. 1.

In this case, I have shown a bed knife of substantially the same construction as that illustrated and described in Figs. 1 to 4, namely, the spring strip 33 connected to the frame 27a by bolts 34 and having a wear resistant high speed steel strip 35 at its edge. A guiding ramp 36a is also provided as in the case illustrated in Figs. 1 to 4. Since in this construction it is impracticable to place the pivot 28a below the lowest point of the cylinder in which the reel 18 operates it is necessary to have the cutting edge 35 at a point where the tangent to the cylinder will be at an angle substantially above the horizontal, i. e., substantially above the pivot 28a. Thus, it will be observed on Fig. 5 that the cutting edge 35 is substantially behind the axis of the reel 18.

In this embodiment I have shown also the corners 37a of increased circumferential width. This is to illustrate an alternative way of increasing the wear resistance of the corners where they ride on the ramp 36a. It should be understood that this is in no way dependent upon the other features shown in this drawing but can be used alternatively with the hard edged insert, as shown in Figs. 1 and 2 and described above.

The operation of the embodiment shown in Fig. 5 is substantially identical with that shown in Figs. 1 to 4. In normal operation the light pressure from the spring 29a and the blade 33 gives a minimum of resistance to drive and yet assures a clean cut and a perfect contact between the blades. With a heavier cut the reaction between the blades tends to tighten the pressure between them due to the turning moment exerted upon the frame 27a, but if the obstruction is not cut, even with the increased pressure, the springs then yield and either pass the obstruction or absorb the shock with stalling of the machine.

Figure 12:
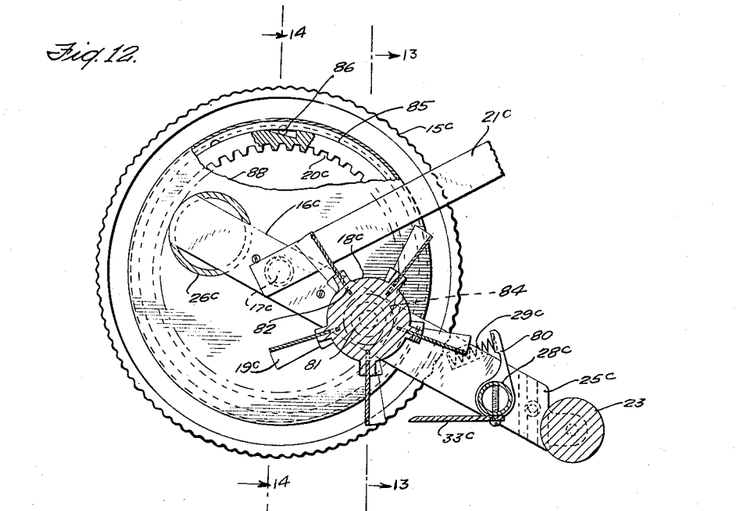
Fig. 12 is a view in cross-section of another preferred embodiment of my invention.
Figures 13, 14:
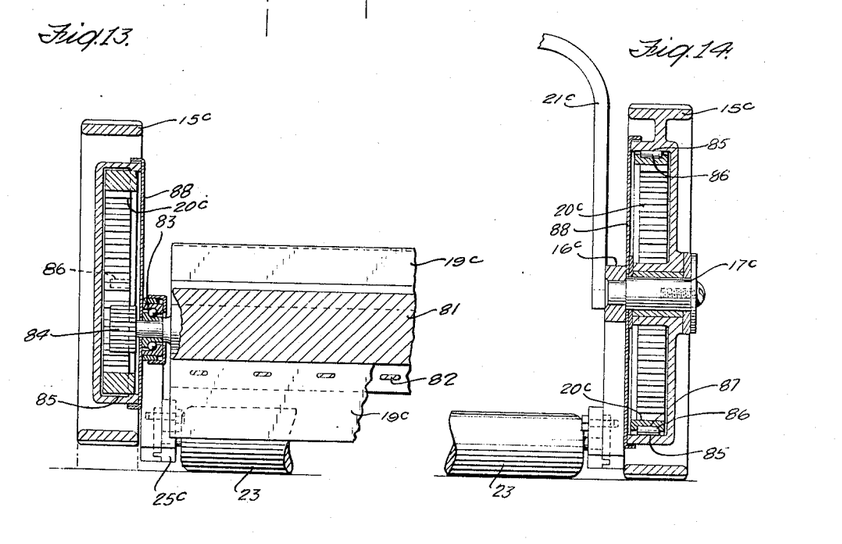
Figs. 13 and 14 are fragmentary sectional views taken on lines 13—13 and 14—14 respectively of Fig. 12.

In Figs. 12, 13 and 14, there is shown a mower similar in principle to that shown in Fig. 5 and just described, but of simpler construction.

The bed knife 33c is bolted to the tubular bar 28c pivoted in the side frame 16c and urged against the reel by the pressure of a compression spring 29c against the arm 80 which is secured to the bar 28c. The edge of the bed knife 33c contacts with the reel behind its lowest point, so as to make an angle with the tangent to the reel at the point of contact and give a reaction tightening effect as already described.

The bed knife 33c is tilted very slightly with relation to the axis of the reel, the corner at which the fly knives first contact being a few thousandths of an inch lower than the opposite end, and the spiral of the fly knives is such that the corner of one knife just passes over the corner of the bed knife before the opposite corner of the preceding fly knife leaves the bed knife. In this way the bed knife is held depressed by each fly knife until the corner of the next fly knife is over the bed knife and then to release it, permitting it to snap into shearing contact. Thus, the necessity for the ramp 36 is avoided.

Figure 6:
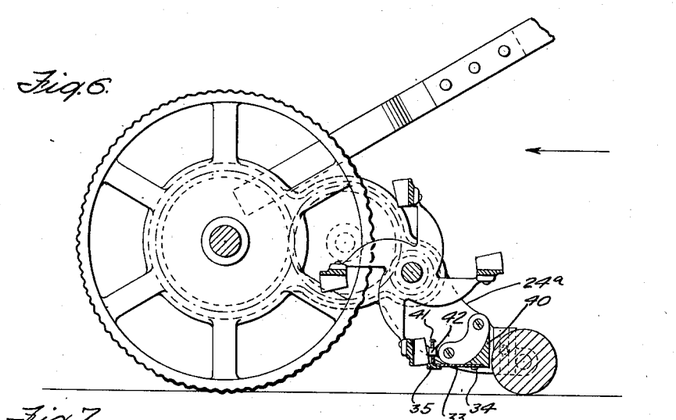

The reel 18c is made by die casting a central shaft 81 onto the blades 19c which have been fixed in position, each of which is made of flexible steel similar to that already described for the bed knife of Fig. 1 or Fig. 6, and is twisted to the desired spiral. These blades are preferably punched as indicated at 82 to anchor them in the cast metal of the shaft 81. The ends of this shaft are machined for the mounting of the reel bearings 83 and the pinions 84. By using a light metal die-casting alloy for the shaft 81 and the thin steel blades 19c the momentum of the reel is greatly reduced, and with it the danger from injury to the blades by striking an obstruction. The use of the spring steel blades 19c also protects against such injury by permitting them to yield without permanent injury.

The pinions 84 are driven from the ground wheels 15c through the over-running clutch 85—86—87 and the internal gear 20c which is integral with the clutch member 87. The wheels are pivoted on the stub axles 17c, which in turn are secured in the side frames 16c. Dust plates 88 cover the clutches and gears.

The frame is completed and made rigid by the cross tube 26c of relatively large diameter. The side frame members 16c may be die-castings with the shafts 17c and the cross tube 26c cast therein as inserts.

Another simple embodiment of my invention is shown in Fig. 6, but one which will perform less perfectly than those shown in Figs. 1 to 5 and 12 to 14. In this figure a lawn mower of standard construction is shown except that in place of the fixed rigid bed knife adjustable by means of opposing screws a bed knife is provided which consists of a blade 33 and a hardened edge 35 substantially like that already described in connection with Figs. 1 to 4 inclusive. The blade 33 is bolted by means of bolts 34 to a rigid cross member 40 fixed to the frame 24a.

In this case also I have shown an alternative, but less desirable, method for avoiding clashing between the corners of the fly knives 19 and the edge 35. An adjustable screw 41 is threaded into a boss 42 on the frame member 24a. The end of this screw 41 engages the end of the bed knife and holds it at a level such that the corners of the fly knives will just clear it. Due to the tension of the spring blade 33 the remainder of the edge piece 35 will be canted upwardly, and consequently will engage the fly knives with resilient pressure adapted to maintain the shearing contacts throughout their lengths and to assure an efficient self-sharpening action.

To the extent that the force exerted by a blade 19c at the edge 35 has an upward component as well as one parallel to the blade 33 there will be in this construction, as in the construction already discussed, a tightening effect due to the reaction between the blades when a heavier cut is encountered. Both this reaction function and the necessity for yielding through a relatively large amplitude to permit passage of obstructions, and also the necessity for taking up wear on the edges of the blade without substantial change in the pressure exerted thereon, depend upon the width of the resilient blade 33. The correct width for any particular conditions and design will, of course, depend upon the properties of the steel and the thickness of the blade; but in my experience I have found that, with available steels which are satisfactory as to properties and thickness in other respects, a two inch width is the minimum that will serve satisfactorily.

In this construction also the rigid edge 35 is of great importance. Without this, a strain due to striking a stone or other obstructions may be highly localized on one point of the spring blade 33 and in order to avoid permanent deformation of the spring blade its characteristics would have to be chosen to withstand at that one point the entire pressure necessary to stall the machine. This may be an almost impossible condition, especially in connection with the other conditions imposed upon the spring; but with the rigid edge 35 such a force is distributed over the length of the blade, and therefore, the spring blade may be chosen to give the desired characteristics without the necessity for resisting permanent deformation at one point due to a localized excessive force. Furthermore, by segregating the spring function from the function of resisting wear it is possible to choose the spring blade more accurately to fit the other requirements and to relieve it of the necessity for absorbing a substantial shift due to wear on the blade.

Figures 7, 8:
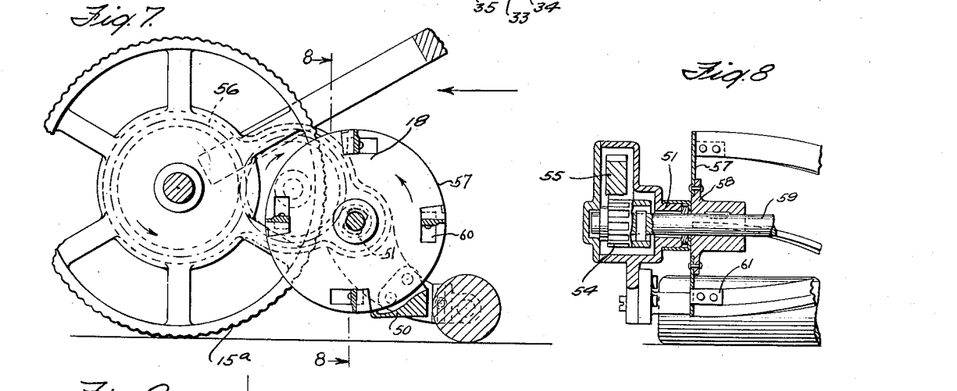
Fig. 8 is a fragmentary longitudinal sectional view taken on line 8—8 of Fig. 7.

In Figs. 7 and 8, I have shown an embodiment in which the resilient pressure is due to the drive reaction instead of to the spring pressure and the reaction between the blades. In this case I have chosen a standard construction similar to that shown in Fig. 6, but including also the standard bed knife 50 as used prior to my invention, except that I have omitted the usual adjustment. The only other change from the standard construction is in the bearing 51 for the reel 18. In the standard construction, of course, this bearing is adapted to hold the axis of the reel in a fixed position, and adjustment is secured by moving the bed knife toward and away from the reel. In the present case the bearing 51 is elongated radially with the reel in the direction of the point of contact between the reel and the edge 53 of the bed knife 50 so that it may yield to pass small obstructions and may move toward the bed knife to increase the pressure thereon or to take up wear on the blade.

The reel 18, being driven through the ratchet pinion 54 on its shaft, the idler-pinion 55 and the pinion 56 on the ground wheel 15, there will be a reaction of the gear 55 on the gear 54 and therefore upon the reel 18 which will tend to force the reel against the bed knife 50. The force which this reaction exerts under various circumstances may be increased or decreased in the designing of the machine by placing the pinion 54 more nearly horizontally behind or more nearly vertically above or below the pinion 55. Supplemental means can, of course, be used to oppose the force if excessive or to supplement it if insufficient, but these are unnecessary if the machine is properly designed, bearing in mind the above principles.

In the operation of this machine the reel 18 at first runs relatively freely, being pressed against the bed knife only by the force of gravity and the gear reaction to the slight friction or drag between the knives. When a heavy cut is encountered, however, the gear reaction increases rapidly; and consequently the blades are pressed very much more strongly together. As in the cases already discussed if the material is not cut in spite of the increased pressure the reel will be lifted away from the bed knife and the obstruction allowed to pass between the blades.

The construction as shown in Figs. 7 and 8 is designed only to pass relatively small obstructions such as wires and nails, etc., it is clearly possible, however, to permit the passage of larger obstructions merely by providing a longer opening in the bearing 51; and the shock absorbing action preceding the stalling of the machine may in such case be provided by a spring acting upon the shaft of the reel 18 resisting the upward movement of the shaft in the bearing opening.

Another feature which is illustrated in Figs. 7 and 8 is an alternative to the guiding ramp 36 and the adjustable stop 41 for assuring the free passage of the corners of the fly knives onto the edge of the bed knife. This feature is not dependent upon the other features shown in Figs. 7 and 8, but as already stated, is alternative to the stop 41 and the ramp 36 and other means which might be used for the same purpose. In this case a disc 57 at the leading edge of the reel serves at once the guiding function just discussed and the function of one of the spiders for holding the spiral fly knives. This disc 57 may be of sheet metal as shown and riveted or otherwise secured to the hub 58 on the reel shaft 59. Portions of the disc are stamped out as indicated at 60 and bent back to a perpendicular position to form the ears 61, to which the fly knives are riveted. In order to prevent the formation of a step where this disc wears on the bed knife in this case as in the cases already described, there should be either a bead or insert 53a of wear-resistant material, e. g., high speed steel, at the end of the bed knife or portion on the bed knife adapted to increase the area of contact with the disc 57, or any other suitable means for equalizing the wear at this point with the wear along the remainder of the blade.

Figure 9:
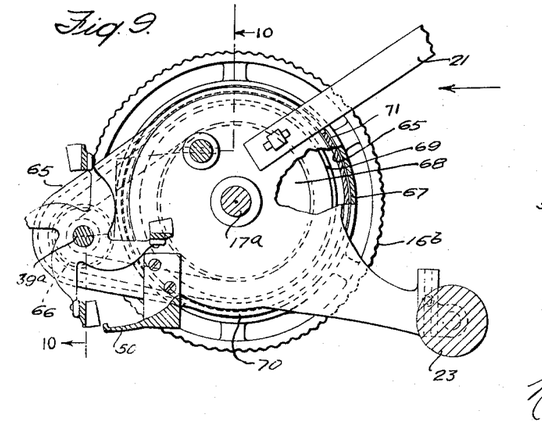
Fig. 9 is a sectional view similar to Figs. 1, 5, 6 and 7 but of another embodiment of the invention.
Figure 10:
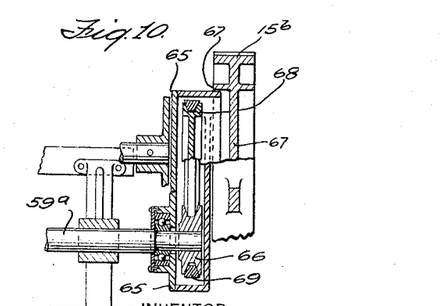
Fig. 10 is a fragmentary longitudinal section taken on line 10—10 of Fig. 9.

In Figs. 9 and 10 is shown a construction in which the resilient pressure between the reel and the bed knife is due to gravity and to drive reaction as in Figs. 7 and 8. In this case, however, instead of using a slotted bearing, the reel shaft 59a is mounted in a housing 65 pivoted on the wheel axles 17a. The housing 65 encloses a pulley 66 on the reel shaft and together with the housing portion 67 of the drive wheel 15b encloses a pulley 68 mounted on the axle 17a and connected to the ground wheel 15b. Finally the V belt 69 connects the pulleys 66 and 67. A separate frame 70 carries the bed knife 50, the axle 17a, the ground roller 23 and the handle 21.

Since the housing 65 is entirely free from the side frame 70 and is rotatable upon the axle 17a the reel 18b is free to move toward or away from the bed knife 50 in a circular path about the axle 17a; and the drive reaction from the belt 69 on the pulley 66 tends to pull the reel down in this path against the bed knife 50. Consequently in this case, as in the case illustrated in Figs. 7 and 8, the reel may be made to run easily so long as it is not cutting or is taking only a light cut; as soon as a heavy cut is engaged the drive reaction will tend to press the reel more strongly against the bed knife 50; and, if even this increased pressure does not result in a cutting of the material between the blades, then the reel can yield and move away from the bed knife 50 allowing the obstruction to pass between the blades.

The corners of the fly knives may be led onto the bed knife in any suitable way, e. g., as already discussed in connection with the other figures. In the example shown the housings 65 at opposite sides of the machine are connected by the tie bar 71, which is shown as welded to the housing 65 just below the handle 21. The edge of the bed knife 50 is canted very slightly toward the reel and the leaving corner of one blade is slightly behind the entering corner of the next blade for the purpose described in connection with Figs. 12 to 14.

In Fig. 11, I have shown a mower in which centrifugal force is used to provide resilient pressure between the blades of the reel and the bed knife. In this case the fly knives 19b are mounted on the reel 18b by means of flat springs 75, so that they may throw outwardly to some extent and in the absence of centrifugal force will run free of the bed knife or make only a minimum contact pressure less than is required for the lightest cut, and are pressed together by centrifugal force when the machine is operating. The fly knives in this case are set at an angle such that when they approach the bed knife they produce not only a shear action but a scythe action as well. Due to the wear between the fly knives and the bed knife the side edges are kept sharpened and consequently this type of mower will work particularly well where the toughest grass or weeds are to be cut.

A leading ramp 36b is in this case made integral with the rigid bed knife 50a. Otherwise the construction of the mower is conventional.

In the operation of this mower as shown in Figure 11, a light cut at ordinary speeds is almost entirely due to the centrifugal force throwing the blades 19b outwardly with flexing of the springs 75. Either an increase in the resistance of the material to be cut and consequently of the reaction between the blades, tending to force the fly knives 19b outwardly against the bed knife, or an increase in the speed of the mower will increase the pressure exerted between the fly knives and the bed knife. This construction has the advantage that it puts the pressure to some extent at least within the control of the operator, since by increasing the speed he may definitely increase the pressure of the blades. When the machine is operated at a uniform speed the effect of centrifugal force is substantially similar to that of the spring 29 in Fig. 1 or the effect of gravity in the machines illustrated in Figs. 7 to 10 inclusive. That is to say it is a resilient pressure which acts independently of the adjustment and wear and of the reaction due to varying conditions of operation. Just as spring pressure or gravity may be taken advantage of independently, so also centrifugal force may be used independently, i. e., without the springs 75, with rigid pivots or slides; but centrifugal force alone is subject to the serious disadvantage that it requires operation within a limited speed range, since, with increase or decrease from a given speed, a very rapid change in the centrifugal force occurs.

The combination of centrifugal force and reaction force, as in the machine of Fig. 11, is of advantage because under normal operating conditions the centrifugal force may supply a greater part of the required pressure between the blades, whereas upon the stalling of the machine this pressure will be entirely released, and it will be easier therefore to pass or remove any obstructions and to free the machine, than with the construction illustrated in Fig. 1. This, however, is of relatively small importance compared with other advantages which will ordinarily lead to the adoption of the preferred embodiment shown in the other figures rather than an embodiment using centrifugal force.

Although I have shown and described above a number of examples of embodiments of my invention and have suggested certain modifications, I have not tried to make any exhaustive description nor even mention of all ways in which my invention may be used, but rather by these few illustrations to explain the invention and the principles involved in its use so that others skilled in the art will be able to use the invention in innumerable different forms as may be best suited to the specific requirements of various uses.

I claim:
1. A mower as defined in claim 5, in which one of the blades is a broad spring metal strip which, due to its own spring, exerts a resilient pressure against the other blade.

2. A mower as defined in claim 5 in which resilient pressure is exerted by the force of gravity acting upon a movably mounted blade.

3. A mower as defined in claim 7 in which the reel is movable as a whole toward and away from the bed knife and the combination further includes driving means adapted to exert a turning moment on the reel by a force thereon having a substantial component in a direction adapted to press the reel against the bed knife.

4. A shear device comprising a rotatable reel with spiral fly knives and a stationary bed knife, one of said knives being resiliently pressed against the other, the spiral pitch of the fly knives being such that the entering corner of one fly knife comes over the bed knife just before the leaving corner of the preceding fly knife passes off from the bed knife, and the knives are so shaped and positioned that the leaving corner holds the knives in relation such that the entering corner of the next fly knife can pass over the bed knife without clashing.

5. A rotary reel mower which comprises cooperating shear blades, a reel on which at least one of said blades is mounted, rotatably positioned relative to another of said blades so that their edges are adapted progressively to cross one another at a shearing angle as rotation of the reel occurs, driving means for rotating said reel adapted to transmit a limited torque thereto, means for resiliently mounting one of said blades pressed into shearing relation to the other, said mounting means having such elasticity as to permit its yielding under normal conditions of use without permanent deformation, but having a load-deflection characteristic such that elastic deformation results in greatly increasing the resistance to the driving torque so that such resistance overbalances the limited driving torque before permanent deformation of either shear blade or said mounting means occurs, and means for holding off the part of the resiliently mounted shear blade which first meets its cooperating blade until the edges of said blades have crossed.

6. A lawn mower as defined in claim 5 in which the means for resiliently mounting the blade is fixedly positioned on the mower and the shearing edge of said blade is resiliently movable towards the path of the driven blade in a direction which is between the direction of movement of the driven blade and the normal to said direction of movement thereabove.

7. A mower comprising a rotating reel having spiral fly knives thereon, a bed knife adapted to cooperate to form a shear with said fly knives, one of said cooperating shear knives having resiliently flexible means for mounting its cutting edge and pressing it against the other knife with a pressure sufficient for cutting light materials but easily overcome by material which the mower is otherwise capable of cutting, the cutting edge of said knife being free to press into tighter engagement with the cooperating knife, and said mounting means being adapted to convert a part of the shearing force when resisted by material between the knives to press said cutting edge toward the cooperating knife.

8. A mower comprising a rotating reel having spiral fly knives thereon, a bed knife adapted to cooperate to form a shear with said fly knives, means for mounting the edge of the bed knife one part of said means being rigidly positioned on the mower but adapted to allow resilient movement of the edge of the bed knife about said part, and said part being positioned relative to said edge so that a force acting on the edge along the direction of movement of the fly knives gives a turning moment on the bed knife which tends to press its shear edge into tighter shear relation to the fly knives.

9. A mower as defined in claim 8 in which the means for mounting the edge of the bed knife comprises a portion which is free to move about the rigidly positioned part toward and away from the rotating reel, and spring means connected to said portion for pressing it and the bed knife edge toward the reel.

10. A mower as defined in claim 8 in which the rigidly positioned part of the mounting means is substantially inflexible, pivotally connected to the mower and free to rotate so as to drop the bed knife away from the rotating reel or to press it into tighter shear relation thereto, and the mower further comprises spring means for rotating said inflexible part so as to press the bed knife edge against the fly knives, said spring means acting through the inflexible part upon the bed knife edge substantially uncontrolled by any positive adjusting device.

11. In combination with a lawn mower having a frame, a wheel at each end of said frame, a rotary cutting reel including a plurality of spiral fly knives mounted in said frame, means operatively connecting said wheels and said reel to rotate said reel when said wheels are rotated, means to impart motion to said mower, and a bed knife mounted for shearing contact with said fly knives as said reel is rotated; means to adjust the position of said bed knife comprising a pair of lever members pivotally attached to said frame at either end of said reel at points substantially forward of said bed knife, each of said lever members having a rearwardly extending arm rigidly connected to an end of said bed knife and a forwardly extending arm, resilient means on said frame exerting a downward force on each of said forward arms sufficient to maintain said bed knife in shearing contact with said fly knives but not substantially greater than that required to prevent said bed knife from dropping away from said fly knives by reason of its own weight and that of the said rearwardly extending arms, whereby the position of the bed knife is effectively controlled by the nature of materials between said bed knife and a fly knife in contact therewith.

RICHARD D. CLEMSON.